United States Patent
Suzuki

(10) Patent No.: US 11,752,806 B2
(45) Date of Patent: Sep. 12, 2023

(54) PNEUMATIC TIRE

(71) Applicant: The Yokohama Rubber Co., LTD., Tokyo (JP)

(72) Inventor: Yuhei Suzuki, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 722 days.

(21) Appl. No.: 16/491,149

(22) PCT Filed: Mar. 5, 2018

(86) PCT No.: PCT/JP2018/008393
§ 371 (c)(1),
(2) Date: Sep. 4, 2019

(87) PCT Pub. No.: WO2018/164073
PCT Pub. Date: Sep. 13, 2018

(65) Prior Publication Data
US 2020/0031170 A1 Jan. 30, 2020

(30) Foreign Application Priority Data

Mar. 6, 2017 (JP) ................... 2017-041922

(51) Int. Cl.
*B60C 11/11* (2006.01)
*B60C 11/12* (2006.01)
*B60C 11/13* (2006.01)
(52) U.S. Cl.
CPC ........... *B60C 11/11* (2013.01); *B60C 11/1236* (2013.01); *B60C 11/1263* (2013.01); *B60C 11/1392* (2013.01); *B60C 2200/14* (2013.01)
(58) Field of Classification Search
CPC . B60C 11/11; B60C 11/0306; B60C 11/1307; B60C 11/1236; B60C 11/1263
See application file for complete search history.

(56) References Cited

U.S. PATENT DOCUMENTS

2002/0026972 A1 3/2002 Ochi
2014/0326381 A1* 11/2014 Hamanaka ............. B60C 11/11
152/209.18

(Continued)

FOREIGN PATENT DOCUMENTS

GB 460338 A * 1/1937 ............... B60L 1/16
JP 2002-029224 1/2002

(Continued)

OTHER PUBLICATIONS

International Search Report for International Application No. PCT/JP2018/008393 dated Apr. 24, 2018, 4 pages, Japan.

*Primary Examiner* — Robert C Dye
*Assistant Examiner* — Nicholas J Weiler
(74) *Attorney, Agent, or Firm* — THORPE NORTH & WESTERN

(57) ABSTRACT

A pneumatic tire is provided. Center blocks in a center region are in pairs across grooves inclined with respect to a circumferential direction. Each of the center blocks extends from one side to the other of an equator and includes a notch defined by a first and second walls connected in a V-shape in a tread contact surface. The first wall extends within ±20° of the circumferential direction, the second wall extends within ±10° of a lateral direction, an average angle of sipes formed in one of the center blocks and the shoulder blocks is smaller than or equal to 90°±10° with respect to the equator for a first region, smaller than or equal to 130°±10° for a second region, and smaller than or equal to 70°±10° for a third region, and each of the sipes includes at least one bent portion.

12 Claims, 4 Drawing Sheets

(56) References Cited

U.S. PATENT DOCUMENTS

| | | | | |
|---|---|---|---|---|
| 2017/0253086 A1* | 9/2017 | Sanae | ............... | B60C 11/0304 |
| 2017/0297379 A1* | 10/2017 | Higashiura | ......... | B60C 11/0302 |
| 2018/0154703 A1 | 6/2018 | Corp | | |

FOREIGN PATENT DOCUMENTS

| | | | | |
|---|---|---|---|---|
| JP | 2012-051504 | | 2/2005 | |
| JP | 2015-223884 | | 12/2015 | |
| JP | 2016-007861 | | 1/2016 | |
| JP | 2016-222207 | | 12/2016 | |
| JP | 2017-001463 | | 1/2017 | |
| WO | WO-2011080565 A1 * | | 7/2011 | ........... B60C 11/033 |
| WO | WO 2016/194287 | | 12/2016 | |

\* cited by examiner

PNEUMATIC TIRE

TECHNICAL FIELD

The present technology relates to a pneumatic tire suitable as a tire used for driving on unpaved roads and in particular relates to a pneumatic tire providing enhanced driving performance on unpaved roads and enhanced damage resistance.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, driving performance on unpaved roads is improved by biting into mud, snow, sand, stone, rock, or the like on a road surface (hereinafter, referred to collectively as "mud or the like") to achieve traction performance and preventing grooves from being blocked with mud or the like (for example, see Japan Unexamined Patent Publication No. 2015-223884).

However, in such a tire, the groove area is set to a large value in order to sufficiently bite into mud or the like, or a sipe is formed in each block in order to increase the number of edge components. Thus, there is a problem in that block rigidity is likely to decrease, leading to difficulty in providing both improved driving performance on unpaved roads (in particular, traction performance and starting performance) and ensured damage resistance of the blocks in a compatible manner to a high degree. Thus, there is a demand for measures for effectively biting into mud or the like via grooves to improve driving performance on unpaved roads (in particular, muddy roads or rocky areas), while ensuring sufficient damage resistance of the blocks, and providing such performance in a well-balanced, compatible manner.

SUMMARY

The present technology is to provide a pneumatic tire suitable as a tire used for driving on unpaved roads, the pneumatic tire providing enhanced driving performance on unpaved roads and damage resistance.

A pneumatic tire according to an embodiment of the present technology includes a tread portion extending in a tire circumferential direction to form an annular shape, a pair of sidewall portions disposed on both sides of the tread portion, and a pair of bead portions disposed inward of the sidewall portions in a tire radial direction, wherein a plurality of center blocks are provided in a center region of the tread portion, and a plurality of shoulder blocks are provided in a shoulder region of the tread portion, the center blocks are arranged in pairs across inclined grooves extending at an incline with respect to the tire circumferential direction, the center block on one side of each of the pairs of center blocks extends from one side to an other side of a tire equator across the tire equator, the center block on the other side extends from the other side to the one side of the tire equator across the tire equator, each center block includes a notch defined by two wall surfaces connected in a V-shape in a tread contact surface, the two wall surfaces include a first wall extending at an angle of within ±20° with respect to the tire circumferential direction in the tread contact surface and a second wall extending at an angle of within ±10° with respect to a tire lateral direction, a sipe is formed in each of the center blocks and the shoulder blocks, a first region is defined as a range from 0% to 12.5% of a distance D from the tire equator to an end portion of the tread contact surface with reference to the tire equator, a second region is defined as a range from 12.5% to 75% of the distance D, a third region is defined as a range from 75% to 100% of the distance D, an average angle of the sipes in the first region is within a range of 90°±10° with respect to the tire equator, an average angle of the sipes in the second region is within a range of 130°±10° with respect to the tire equator, an average angle of the sipes in the third region is within a range of 70°±10° with respect to the tire equator, and each of the sipes includes at least one bent portion.

In the present technology, as described above, the center blocks extend across the tire equator, and thus the number of edge components of each center block in the tire lateral direction can be increased, providing improved driving performance on unpaved roads (for example, mud performance or the like). In addition, the notch is formed in each of the center blocks and can effectively grip mud or the like. This also allows provision of improved driving performance on unpaved roads (for example, mud performance or the like). In particular, since the extending directions of the first wall and the second wall are set to the above-described angles, the first wall advantageously suppresses lateral slippage of the tire, and the second wall advantageously improves traction performance. Furthermore, in a case where the sipes are formed in each block as described above, the average angle of the sipes is within a specific range for each region in the tire lateral direction, and each of the sipes is provided with the bent portion. Thus, an appropriate sipe length can be ensured, and a sufficient edge effect can be obtained to improve the driving performance on the unpaved road. On the other hand, setting of the angles and provision of the bent portion as described above suppress flexure of the blocks. Accordingly, damage resistance can be favorably maintained. As a result, both driving performance on unpaved roads and damage resistance can be favorably provided in a well-balanced, compatible manner.

In the present technology, a pair of sipes extending across the notch is preferably formed on both sides of the two wall surfaces of the notch in the center block. By providing the sipes in this manner, the sipes on both sides of the notch extend substantially linearly. This is advantageous in maintaining block rigidity, and thus damage resistance.

In this case, the pair of sipes formed in the center block preferably include a sipe including a first end communicating with the inclined groove and a second end terminating near the notch without communicating with the notch. Additionally, the pair of sipes formed in the center block preferably includes a sipe including a first end communicating with a groove formed between the center block and the shoulder block and a second end terminating near the notch without communicating with the notch. Thus, block rigidity can be ensured by providing an end portion that does not communicate with the notch, and drainage from the sipe to the groove can be ensured by providing an end portion that communicates with the groove. This is advantageous in providing both driving performance on unpaved roads and damage resistance.

In the present technology, the sipe formed in the shoulder block at the first end communicates with the groove formed between the center block and the shoulder block and at the second end terminates within the shoulder block. Since such a sipe is formed in the shoulder block, block rigidity can be ensured by providing an end portion that terminates within the block, and drainage from the sipe to the groove can be ensured by providing an end portion that communicates with the groove. This is advantageous in providing both driving performance on unpaved roads and damage resistance.

In this case, preferably, the shoulder block is provided with a shallow groove extending from a road contact surface to an outer side surface of the shoulder block in the tire lateral direction, and the second end of the sipe formed in the shoulder block, the second end terminating within the shoulder block, terminates near an end portion of the shallow groove closer to the road contact surface of the shoulder block without communicating with the shallow groove. Accordingly, even in a case where the shoulder block is provided with the shallow groove, rigidity can be maintained near the shallow groove. This is advantageous in providing both driving performance on unpaved roads and damage resistance.

In the present technology, preferably, each of the sipes includes a portion with a large sipe depth and a portion with a small sipe depth, and has a small sipe depth at least at both end portions of each sipe. Accordingly, rigidity is maintained particularly at the end portion of the sipe communicating with the groove to suppress block deformation. This is advantages in ensuring a shear force to improve traction characteristics and maintaining damage resistance.

In the present technology, an angle at the bent portion of each of the sipes is preferably greater than 90°. Accordingly, no acute-angled separated portions are formed by the sipes. This is advantageous in obtaining the edge effect and maintaining damage resistance.

Note that, in the present technology, an average angle $\theta$ is assumed to be calculated by the following formula.

$$\theta = \theta 1 \times L1/L + \theta 2 \times L2/L + \ldots + \theta n \times Ln/L$$

(However, $\theta 1, \theta 2, \ldots \theta n$ are each an angle at a part of each sipe having the same angle, $L1, L2, \ldots Ln$ are each the length of a part of each sipe having the same angle, and $L$ is the total sipe length (sum of $L1, L2, \ldots Ln$)).

In the present technology, various dimensions (lengths and angles) are values measured when the tire is mounted on a regular rim and inflated to a regular internal pressure, and placed vertically upon a flat surface with a regular load applied thereto. "Length" is the length in the tread contact surface unless otherwise noted. "Road contact surface" of each block is a surface portion of each block actually contacting a plane in which the tire is placed in this state, and does not include, for example, a chamfered portion that does not actually contact the plane. Additionally, "ground contact edge" refers to both ends in the tire axial direction in this state. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO (The European Tire and Rim Technical Organization). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
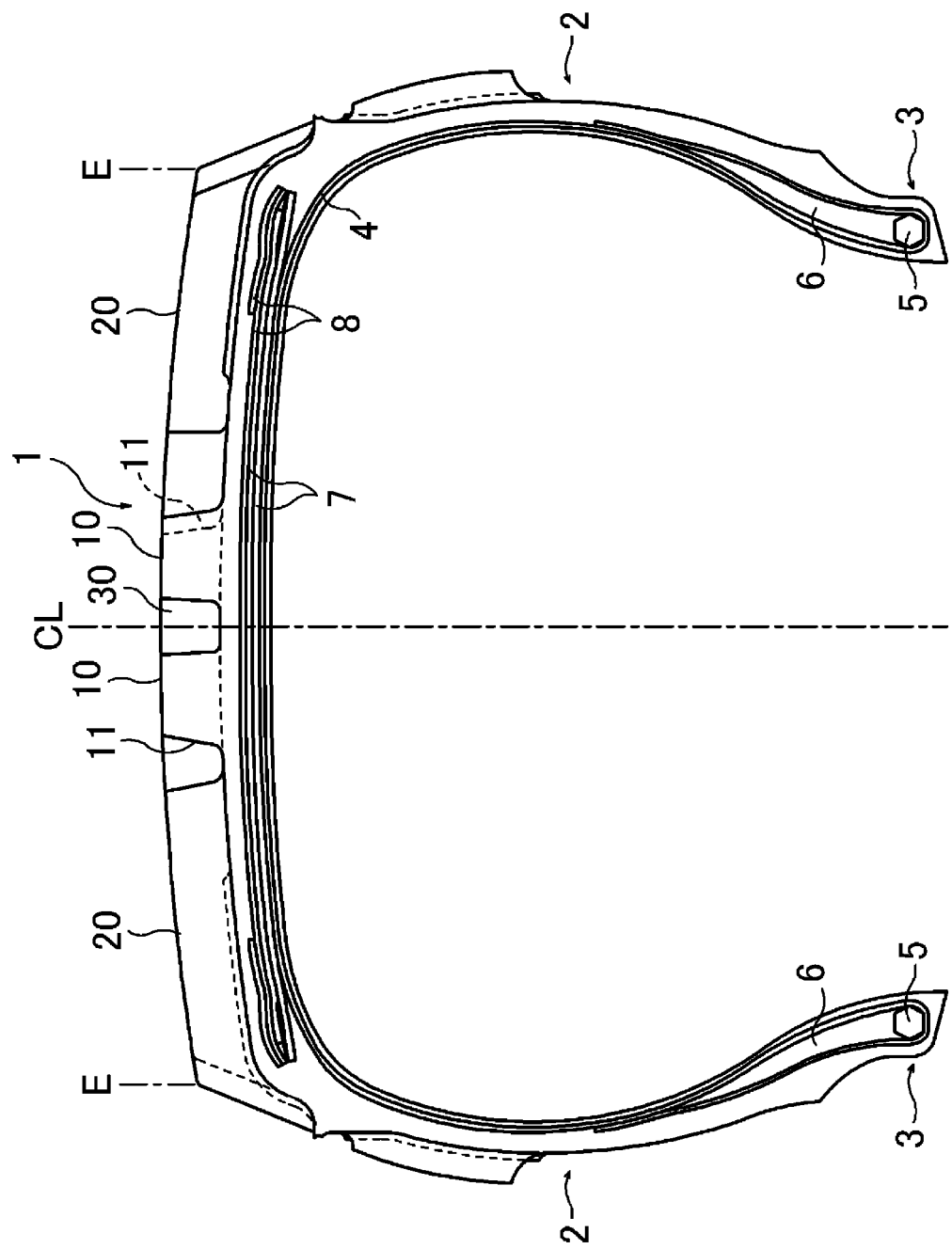
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Note that, in FIG. 1, reference sign "CL" denotes a tire equator, and reference sign "E" denotes a ground contact edge.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
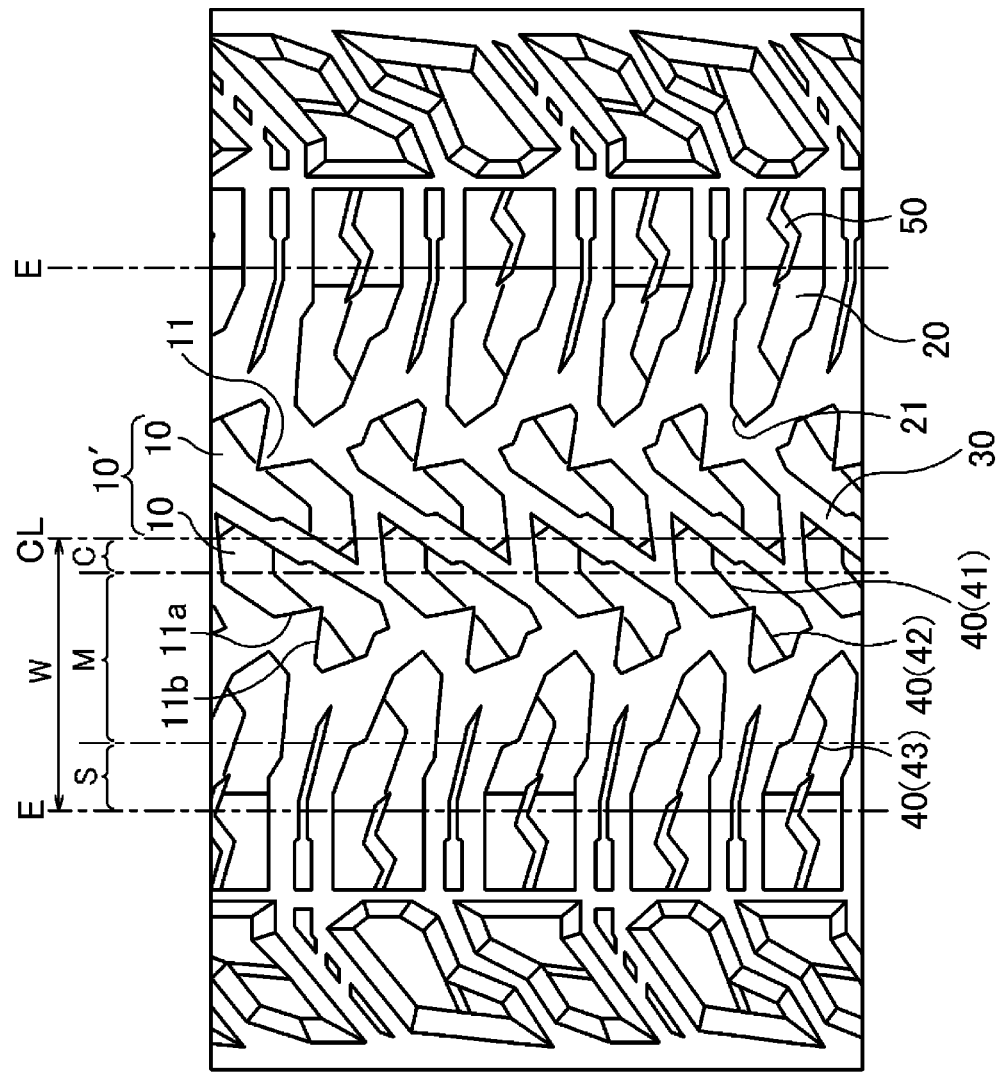
FIG. 2 is a front view illustrating a tread surface of a pneumatic tire according to an embodiment of the present technology.

As illustrated in FIGS. 1 and 2, a plurality of center blocks 10 are provided in a center region of an outer surface of the tread portion 1. Additionally, a plurality of shoulder blocks 20 are provided in shoulder regions of the outer surface of the tread portion 1. In other words, two types of blocks (center blocks 10 and shoulder blocks 20) are provided on both sides of the tire equator on the outer surface of the tread portion 1. The center blocks 10 are disposed closer to the tire equator (center region), and the shoulder blocks 20 are disposed outward of the center blocks 10 in the tire lateral direction (shoulder regions).

The center blocks 10 are arranged in pairs (block pairs 10') across inclined grooves 30 that extend at an incline with respect to the tire circumferential direction. Then, the center block 10 on one side of the pair of blocks 10' (the left side of the tire equator in the figure) extends from the one side (the left side of the tire equator in the figure) to the other side (the right side of the tire equator in the figure) of the equator across the equator. The center block 10 on the other side (the right side of the tire equator in the figure) extends from the other side (the right side of the tire equator in the figure) to the one side (the left side of the tire equator in the figure) across the equator.

Figure 3:
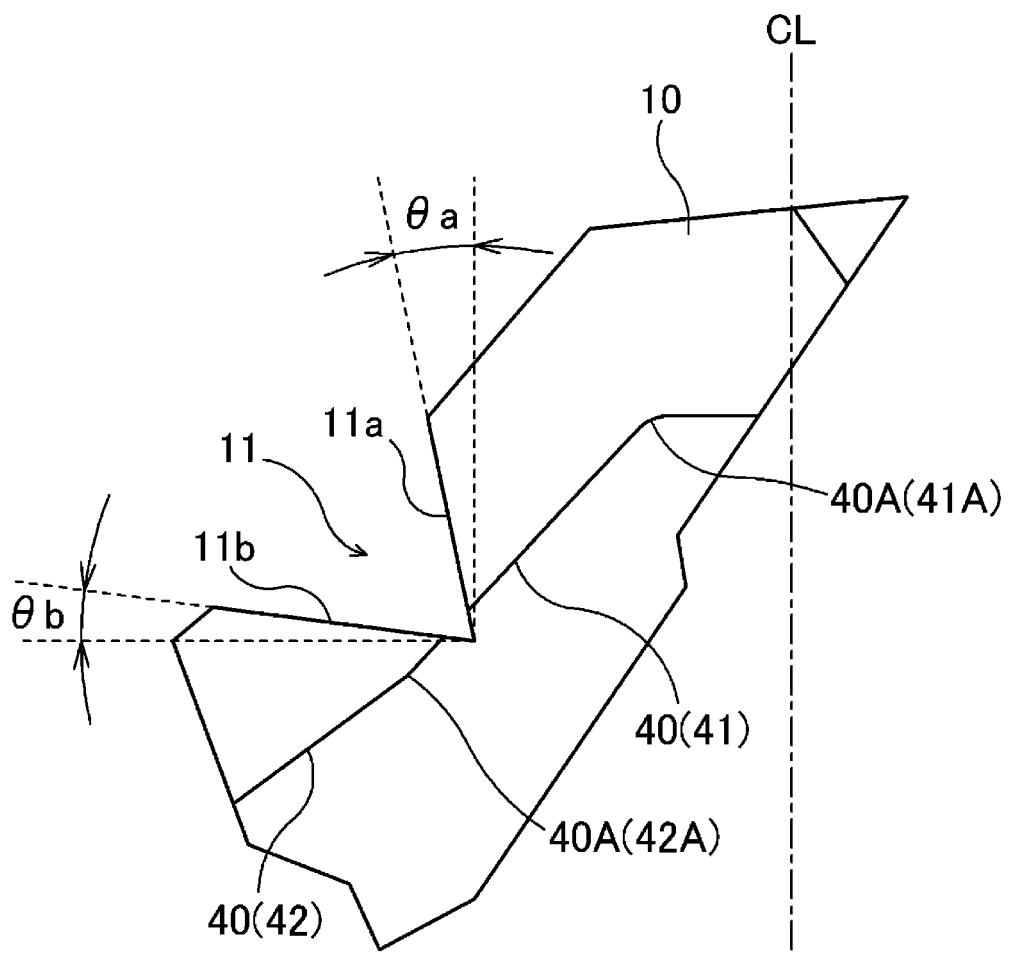
FIG. 3 is a front view illustrating a center block in FIG. 2 in an enlarged manner.

As illustrated in FIG. 3 in an enlarged manner, a notch 11 defined by two wall surfaces (first wall 11a and second wall 11b) connected in a V-shape in a tread contact surface is formed in a wall surface (wall surface opposite to the inclined groove 30) outward of each of the center blocks 10 in the tire lateral direction. The first wall 11a extends at an angle of within ±20° with respect to the tire circumferential direction in the tread contact surface, and the second wall 11b extends at an angle of within ±10° with respect to the tire lateral direction. Namely, in the tread contact surface, an angle θa formed by the first wall 11a with respect to the tire circumferential direction is within ±20°, and an angle θb formed by the second wall 11b with respect to the tire circumferential direction is within ±10°.

The shape of the shoulder blocks 20 is not particularly limited as long as the shoulder block 20 is a block disposed outward of the center block 10 in the tire lateral direction. In the illustrated example, a plurality of the shoulder blocks 20 extending from the outer side of each center block 10 in the tire lateral direction to the ground contact edge E are arranged at intervals in the tire circumferential direction. Note that the shoulder block 20 of the illustrated example includes a third wall 21 facing the notch 11 of the center block 10 and that the third wall 21 can offer resistance to mud or the like acting to flow out from the notch 11, to increase the shear force. This is effective for improving driving performance on unpaved roads.

Sipes 40 (in the illustrated example, three types of sipes including sipes 41 and 42 formed in the center blocks 10 and a sipe 43 formed in the shoulder block 20) are formed in each of the center blocks 10 and the shoulder blocks 20 as described above. Each of the sipes 40 (sipe 41, 42, or 43) includes at least one bent portion 40A (bent portions 41A, 42A, and 43A in the illustrated example). For example, as illustrated, gentle V-shaped sipes 40 (sipes 41, 42, and 43) can be formed that include bent portions 40A (bent portions 41A, 42A, and 43A) each extending linearly on both sides of the bent portion. Additionally, in the present technology, focus is placed on the overall shape of the sipes 40 formed in the tread contact surface rather than on the shape of each sipe 40, and as described below, the sipes 40 are disposed so as to have predetermined directionality for each region in the tire lateral direction.

Figure 4:
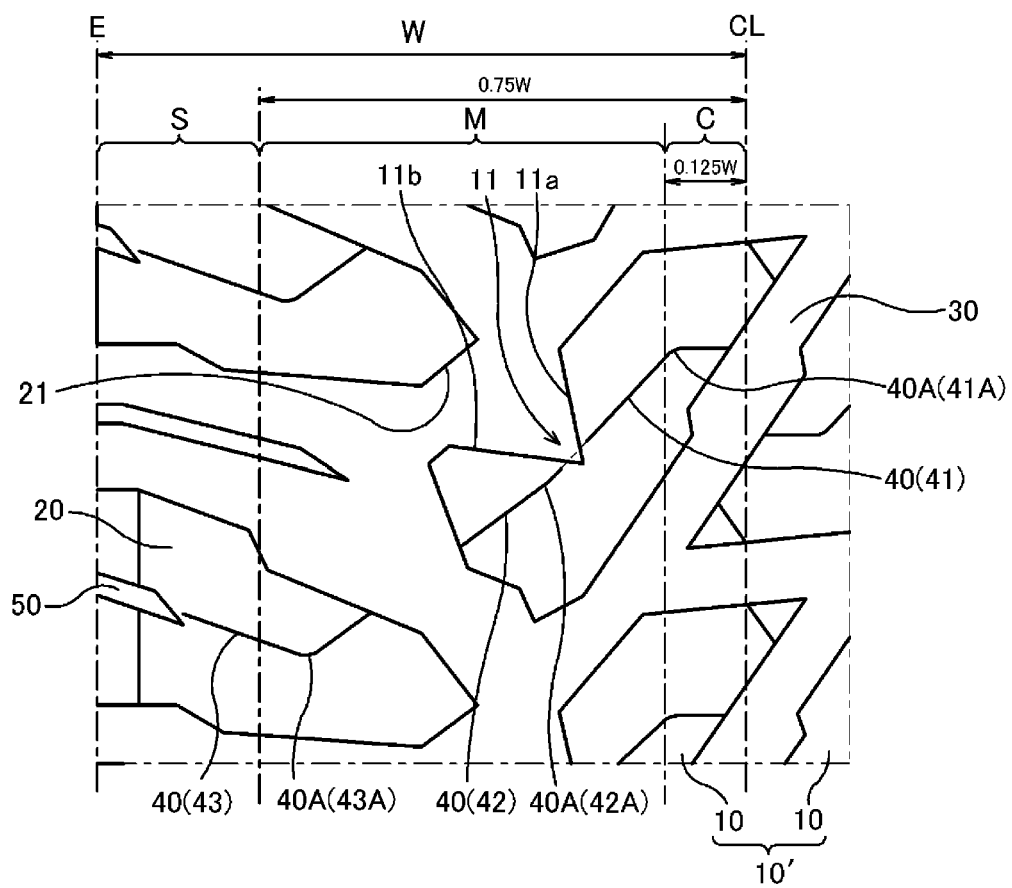
FIG. 4 is a front view illustrating a portion of the center block and a shoulder block in FIG. 2 in an enlarged manner.

Namely, as illustrated in FIG. 4, a first region is defined as a range from 0% to 12.5% of a distance W from the tire equator CL to an end portion of the tread contact surface (ground contact edge E in the illustrated example), a second region is defined as a range from 12.5% to 75% of the distance W, and a third region is defined as a range from 75% to 100% (i.e., the first region C is closer to the tire equator CL (closer to the center of the tread contact surface), the third region S is closer to the shoulder of the tread contact surface, and the second region M is intermediate between the first and third regions). In this case, the average angle of the sipes 40 in the first region C is set within a range of 90°±10° with respect to the tire equator CL, the average angle of the sipes 40 in the second region M is set within a range of 130°±10° with respect to the tire equator CL, and the average angle of the sipes 40 in the third region S is set within a range of 70°±10° with respect to the tire equator CL. In other words, in the illustrated example, the first region C includes a part of each sipe 41 and the average angle of this part is within a range of 90°±10°, the second region M includes the remaining part of each sipe 41, all of each sipe 42, and a part of each sipe 43, and the average angle of these parts are within a range of 130°±10°, and the third regions S includes the remaining part of each sipe 43 and the average angle of this part is within a range of 70°±10°.

Accordingly, the center blocks 10 are provided in block pairs 10', and each of the center blocks 10 extends across the tire equator CL. This enables an increase in the number of edge components of each center block 10 in the tire lateral direction, allowing improvement of driving performance on unpaved roads (for example, mud performance). In addition, the notch 11 is formed in each of the center blocks 10 and can effectively grip mud or the like in the grooves. This also allows improved driving performance on unpaved roads (for example, mud performance). In particular, since the extending directions of the first wall 11a and the second wall 11b are set to the above-described angles, the first wall 11a can suppress lateral slippage of the tire, and the second wall 11b can improve traction performance. This is advantageous in improving driving performance in the unpaved road.

In this case, in a case where the center block 10 is shaped not to extend beyond the tire equator, a sufficient number of edge components of each center block 10 in the tire lateral direction fails to be provided, preventing driving performance on unpaved roads from being improved. In a case where an angle θa of the first wall 11a deviates from the angle of within ±20° with respect to the tire circumferential direction, the extending direction of the first wall 11a in the tread contact surface is excessively inclined with respect to the tire circumferential direction. This prevents a sufficient edge effect of the first wall 11a from being obtained, thus precluding lateral slippage of the tire from being sufficiently suppressed. In a case where the angle θb of the second wall 11b deviates from the angle of within ±10° with respect to the tire lateral direction, the extending direction of the second wall 11b in the tread contact surface is excessively inclined with respect to the tire lateral direction. This prevents a sufficient edge effect of the first wall 11b from being obtained, thus precluding traction performance from being sufficiently improved. In a case where the wall surface angles of the first wall 11a and the second wall 11b are each smaller than the wall surface angle of the wall surface in which the notch 11 is formed, ensuring sufficient block rigidity is difficult.

Furthermore, in a case where the sipe 40 is formed in each of the blocks (the center block 10 and the shoulder block 20) as described above, the average angle of the sipes 40 is set within the above-described range for each of the regions in the tire lateral direction (the first region C, the second region M, and the third region S), and each sipe 40 is provided with the bent portion 40A. Accordingly, a sufficient sipe length can be ensured, and thus a sufficient edge effect is obtained to allow driving performance on unpaved road to be improved. On the other hand, setting of the average angle and provision of the bent portion 40A suppress flexure of the blocks. Thus, damage resistance of the blocks can be favorably maintained. As a result, both driving performance on unpaved roads and damage resistance can be favorably provided in a well-balanced, compatible manner.

In this case, in a case where the sipe 40 lacks the bent portion 40A, a sufficient sipe length fails to be ensured, preventing driving performance on unpaved road from being sufficiently improved. Additionally, prevention of flexure of the blocks based on the bent shape of the sipes 40 is precluded, and favorably maintaining damage resistance is difficult. In a case where the angle of the sipe 40 deviates from the above-described range, the structure of the sipes 40 in each region and the balance of the sipe angle between the regions are affected, leading to difficulty in providing both driving performance on unpaved roads and damage resistance in a compatible manner.

Note that, in the sipes 40 extending beyond the above-described regions (for example, the sipes 41 and 43 in the illustrated example), the bent portion 40A of the sipe 40 need not be a bend point (a point at which the angle changes) necessarily formed in the vicinity of the boundary between the regions in order to satisfy the above-described average angle, and may be provided at any position on each sipe 40. For example, like the bent portion 42A of the sipe 42 in the illustrated example, the bent portion can be provided in the middle of the sipe 42 regardless of the boundary between the above-described regions. Additionally, in the illustrated example, each sipe 40 is provided with one bent portion 40A. However, each sipe 40 may be provided with a plurality of bent portions 40A as long as the above-described average angle is satisfied.

In the center block 10, two sipes 41 and 42 may be provided on the respective sides of the wall surfaces (first wall 11a and second wall 11b) of the notch 11, as illustrated. The sipes 41 and 42 may extend across the notch 11. That is, as illustrated, linear portions of the sipes 41 and 42 located closer to the notch may be disposed on extension lines (dashed lines in the figure) of the sipes 42 and 41 located closer to the notch 11. In other words, the linear portions of the sipes 41 and 42 located closer to the notch preferably have the same extending direction. In a case where the sipe 40 is formed in the center block 10 in this manner, the sipes 41 and 42 on the respective sides of the notch 11 extend substantially linearly without any change in angle. This is advantageous in maintaining block rigidity and thus damage resistance.

In a case where the sipes 41 and 42 are formed in this manner, end portions of the sipes 41 and 42 located closer to the notch 11 preferably terminate without communicating with the notch 11. In other words, each of the sipes 41 and 42 may at a first end communicate with the groove around the center block 10 and at a second end terminate near the notch 11 without communicating with the notch 11. In the illustrated example, the sipe 41 closer to the first wall 11a at the first end communicates with the inclined groove 30 but at the second end terminates near the notch 11 without communicating with the notch. Additionally, the sipe 42 closer to the second wall 11b at the first end communicates with the groove portion formed between the center block 10 and the shoulder block 20 but at the second end terminates near the notch 11 without communicating with the notch 11. As described above, the sipes 41 and 42 formed on the respective sides of the notch 11 at the first end communicate with the groove at the periphery of the center block 10 to ensure drainage from the sipe 40 to the groove, while at the second end being prevented from communicating with the notch 11 to ensure block rigidity. This is advantageous in providing both driving performance on unpaved roads and damage resistance in a compatible manner.

As illustrated, the shoulder block 20 is preferably provided with the sipe 43 at a first end communicating with the groove at the periphery of the shoulder block 20 (in the illustrated example, the groove formed between the center block 10 and the shoulder block 20) and at a second end terminates within the shoulder block 20. Such a sipe 43 includes an end portion terminating within the shoulder block 20 to allow block rigidity to be ensured, and includes an end portion communicating with the groove to allow drainage from the sipe 43 to the groove to be ensured. This is advantageous in providing both driving performance on unpaved roads and damage resistance in a compatible manner.

In order to increase the number of edge components, the shoulder block 20 can be provided with a shallow groove 50 extending from a road contact surface to an outer side surface of the shoulder block 20 in the tire lateral direction. In a case where the shallow groove 50 is formed, the end portion of the sipe 43 formed in the shoulder block 20, the end portion terminating within the shoulder block 20, preferably terminates near an end portion of the shallow groove 50 closer to the road contact surface of the shoulder block 20 without communicating with the shallow groove 50. With a positional relationship between the shallow groove 50 and the sipe 43 thus defined, even in a case where the shallow groove 50 is formed in the shoulder block 20, the rigidity near the shallow groove 50 can be maintained. This is advantageous in providing both driving performance on unpaved roads and damage resistance in a compatible manner.

At least one sipe 40 is formed in each block (center block 10 and shoulder block 20). However, a plurality of sipes 40 may be formed. In the illustrated example, two sipes 41 and 42 are formed in the center block 10. However, since the sipes 41 and 42 extend across the notch 11 as described above, the pair of sipes 41 and 42 may be considered as a continuous sipe divided by the notch 11. In a case where each block is provided with a plurality of sipes 40, a plurality of such continuous sipes may be formed. Additionally, in a case where each block is provided with a plurality of sipes 40, similar bent sipes 40 (pairs of continuous sipes) are preferably arranged in the tire circumferential direction or the tire lateral direction.

Each of the sipes 40 may have a constant depth all over the length of the sipe 40. However, preferably, the sipe depth varies, and each sipe 40 includes a portion with a relatively large sipe depth and a portion with a relatively small sipe depth. In particular, each sipe preferably has a small sipe depth at both ends of the sipe (both end portions of each sipe 40 preferably have a relatively small sipe depth). With the sipe depth thus varied, rigidity is maintained and block deformation is suppressed particularly at the end portion of the sipe 40 where the sipe 40 communicates with the groove. This is advantageous in ensuring a shear force to improve traction characteristics and maintaining damage resistance. In this case, in each sipe 40, the sipe depth of the relatively shallow portion may be set, for example, from 0.1 times to 0.4 times as large as the sipe depth of the relatively deep portion.

Each of the sipes 40 is preferably gently V-shaped as described above. Specifically, the angle at each bent portion 40A of the sipe 40 (the angle formed between the linearly extending portions on both sides of the bent portion 40A) is preferably greater than 90°. Accordingly, no acute-angled separated portions are formed by the sipes 40. This is advantageous in obtaining the edge effect to improve traction characteristics and maintaining damage resistance.

EXAMPLE

Eighteen types of tires according to Comparative Examples 1 to 5 and according to Examples 1 to 12 were manufactured. The tires have a tire size of LT265/70R17 and include a basic structure illustrated in FIG. 1. The tires include a basic tread pattern illustrated in FIG. 2 and are set for the angle θa of the first wall with respect to the tire circumferential direction, the angle θb of the second wall with respect to the tire lateral direction, the average angle of the sipes in each of the first region, the second region, and the third region, whether each sipe is provided with a bent portion, whether the end portion communicates with the groove, the notch, or the shallow groove, whether the groove depth varies, and the angle of the bent portion as indicated in Tables 1 and 2.

In Tables 1 and 2, "sipe 1" indicates a sipe that belongs to a pair of sipes formed in the center block and that is disposed closer to the tire equator in the tread pattern of FIG. 2, "sipe 2" indicates a sipe that belongs to a pair of sipes formed in the center block and that is disposed on the outer side in the tire lateral direction in the tread pattern of FIG. 2, and "sipe 3" indicates a sipe formed in the shoulder block. In Example 4, in the center block, the sipe and the notch do not overlap, and only one sipe is formed that is shaped such that the sipe 1 and the sipe 2 are continuous (this sipe is considered as "sipe 1" and the "sipe 2" section in Table 2 is left blank).

In Tables 1 and 2, "inner end portion" means an end portion of each sipe located on the inner side (closer to the tire equator) in the tire lateral direction, and "outer end portion" means an end portion of each sipe on the outer side in the tire lateral direction. In these sections, an upper stage indicates which of the inclined groove, the notch, the groove (groove formed between the center block and the shoulder block), and the shallow groove corresponds to the groove near which the end portion is located, and a lower stage indicates whether the end portion is in communication with the groove or the like. For the "Variation in groove depth" section of Tables 1 and 2, "Yes" indicates a case where the sipe depth is relatively small at both end portions, and "No" indicates a case where the sipe depth is constant.

The 18 types of pneumatic tires were evaluated for mud performance and damage resistance by the evaluation methods described below. The results are also shown in Tables 1 and 2.

Mud Performance

The test tires were assembled on wheels having a rim size of 17×8.0, inflated to an air pressure of 450 kPa, and mounted on a test vehicle (pickup truck). Sensory evaluation by a test driver was performed on a muddy road surface in terms of traction performance and starting performance. Evaluation results are expressed as index values, with the value of Comparative Example 1 expressed as an index value of 100. Larger index values indicate superior mud performance.

Damage Resistance

The degree of damage to the test tires was visually evaluated after testing of the above described mud performance. Evaluation results are expressed as index values, with the value of Comparative Example 1 expressed as an index value of 100. Larger index values indicate superior damage resistance.

TABLE 1-1

|  |  |  | Comparative Example 1 | Comparative Example 2 | Comparative Example 3 |
|---|---|---|---|---|---|
| Angle θa of first wall |  | ° | 30 | 30 | 15 |
| Angle θb of second wall |  | ° | 20 | 5 | 20 |
| Average angle | First region | ° | 70 | 70 | 70 |
|  | Second region | ° | 110 | 110 | 110 |
|  | Third region | ° | 50 | 50 | 50 |
| Sipe 1 | Presence of bent portion |  | Yes | Yes | Yes |
|  | Inner end portion |  | Communicating with the inclined groove | Communicating with the inclined groove | Communicating with the inclined groove |
|  | Outer end portion |  | Not communicating with the notch | Not communicating with the notch | Not communicating with the notch |
|  | Variation in groove depth |  | Yes | Yes | Yes |
|  | Angle at bent portion | ° | 120 | 120 | 120 |
| Sipe 2 | Presence of bent portion |  | Yes | Yes | Yes |
|  | Inner end portion |  | Not communicating with the notch | Not communicating with the notch | Not communicating with the notch |
|  | Outer end portion |  | Communicating with the groove | Communicating with the groove | Communicating with the groove |
|  | Variation in groove depth |  | Yes | Yes | Yes |
|  | Angle at bent portion | ° | 120 | 120 | 120 |
| Sipe 3 | Presence of bent portion |  | Yes | Yes | Yes |
|  | Inner end portion |  | Communicating with the groove | Communicating with the groove | Communicating with the groove |

TABLE 1-1-continued

|  |  |  | Comparative Example 1 | Comparative Example 2 | Comparative Example 3 |
|---|---|---|---|---|---|
|  | Outer end portion |  | Not communicating with the shallow groove | Not communicating with the shallow groove | Not communicating with the shallow groove |
|  | Variation in groove depth |  | Yes | Yes | Yes |
|  | Angle at bent portion | ° | 120 | 120 | 120 |
| Mud Performance |  | Index value | 100 | 102 | 101 |
| Damage Resistance |  | Index value | 100 | 100 | 100 |

TABLE 1-2

|  |  |  | Comparative Example 4 | Example 1 | Example 2 |
|---|---|---|---|---|---|
| Angle θa of first wall |  | ° | 15 | 15 | 15 |
| Angle θb of second wall |  | ° | 5 | 5 | 5 |
| Average angle | First region | ° | 70 | 80 | 90 |
|  | Second region | ° | 110 | 120 | 130 |
|  | Third region | ° | 50 | 60 | 70 |
| Sipe 1 | Presence of bent portion |  | Yes | Yes | Yes |
|  | Inner end portion |  | Communicating with the inclined groove | Communicating with the inclined groove | Communicating with the inclined groove |
|  | Outer end portion |  | Not communicating with the notch | Not communicating with the notch | Not communicating with the notch |
|  | Variation in groove depth |  | Yes | Yes | Yes |
|  | Angle at bent portion | ° | 120 | 120 | 120 |
| Sipe 2 | Presence of bent portion |  | Yes | Yes | Yes |
|  | Inner end portion |  | Not communicating with the notch | Not communicating with the notch | Not communicating with the notch |
|  | Outer end portion |  | Communicating with the groove | Communicating with the groove | Communicating with the groove |
|  | Variation in groove depth |  | Yes | Yes | Yes |
|  | Angle at bent portion | ° | 120 | 120 | 120 |
| Sipe 3 | Presence of bent portion |  | Yes | Yes | Yes |
|  | Inner end portion |  | Communicating with the groove | Communicating with the groove | Communicating with the groove |
|  | Outer end portion |  | Not communicating with the shallow groove | Not communicating with the shallow groove | Not communicating with the shallow groove |
|  | Variation in groove depth |  | Yes | Yes | Yes |
|  | Angle at bent portion | ° | 120 | 120 | 120 |
| Mud Performance |  | Index value | 103 | 104 | 105 |
| Damage Resistance |  | Index value | 100 | 103 | 105 |

TABLE 1-3

|  |  |  | Example 3 | Comparative Example 5 | Comparative Example 6 |
|---|---|---|---|---|---|
| Angle θa of first wall |  | ° | 15 | 15 | 15 |
| Angle θb of second wall |  | ° | 5 | 5 | 5 |
| Average angle | First region | ° | 100 | 110 | 90 |
|  | Second region | ° | 140 | 150 | 130 |
|  | Third region | ° | 80 | 90 | 70 |

TABLE 1-3-continued

|  |  |  | Example 3 | Comparative Example 5 | Comparative Example 6 |
|---|---|---|---|---|---|
| Sipe 1 | Presence of bent portion |  | Yes | Yes | No |
|  | Inner end portion |  | Communicating with the inclined groove | Communicating with the inclined groove | Communicating with the inclined groove |
|  | Outer end portion |  | Not communicating with the notch | Not communicating with the notch | Not communicating with the notch |
|  | Variation in groove depth |  | Yes | Yes | Yes |
|  | Angle at bent portion | ° | 120 | 120 | 120 |
| Sipe 2 | Presence of bent portion |  | Yes | Yes | No |
|  | Inner end portion |  | Not communicating with the notch | Not communicating with the notch | Not communicating with the notch |
|  | Outer end portion |  | Communicating with the groove | Communicating with the groove | Communicating with the groove |
|  | Variation in groove depth |  | Yes | Yes | Yes |
|  | Angle at bent portion | ° | 120 | 120 | 120 |
| Sipe 3 | Presence of bent portion |  | Yes | Yes | No |
|  | Inner end portion |  | Communicating with the groove | Communicating with the groove | Communicating with the groove |
|  | Outer end portion |  | Not communicating with the shallow groove | Not communicating with the shallow groove | Not communicating with the shallow groove |
|  | Variation in groove depth |  | Yes | Yes | Yes |
|  | Angle at bent portion | ° | 120 | 120 | 120 |
| Mud Performance |  | Index value | 104 | 103 | 102 |
| Damage Resistance |  | Index value | 103 | 100 | 100 |

TABLE 2-1

|  |  |  | Example 4 | Example 5 | Example 6 |
|---|---|---|---|---|---|
| Angle θa of first wall |  | ° | 15 | 15 | 15 |
| Angle θb of second wall |  | ° | 5 | 5 | 5 |
| Average angle | First region | ° | 90 | 90 | 90 |
|  | Second region | ° | 130 | 130 | 130 |
|  | Third region | ° | 70 | 70 | 70 |
| Sipe 1 | Presence of bent portion |  | Yes | Yes | Yes |
|  | Inner end portion |  | Communicating with the inclined groove | Communicating with the inclined groove | Not communicating with the inclined groove |
|  | Outer end portion |  | Communicating with the groove | Communicating with the notch | Not communicating with the notch |
|  | Variation in groove depth |  | Yes | Yes | Yes |
|  | Angle at bent portion | ° | 120 | 120 | 120 |
| Sipe 2 | Presence of bent portion |  | — | Yes | Yes |
|  | Inner end portion |  | — | Not communicating with the notch | Not communicating with the notch |
|  | Outer end portion |  | — | Communicating with the groove | Communicating with the groove |
|  | Variation in groove depth |  | — | Yes | Yes |
|  | Angle at bent portion | ° | 120 | 120 | 120 |

TABLE 2-1-continued

|  |  |  | Example 4 | Example 5 | Example 6 |
|---|---|---|---|---|---|
| Sipe 3 | Presence of bent portion |  | Yes | Yes | Yes |
|  | Inner end portion |  | Communicating with the groove | Communicating with the groove | Communicating with the groove |
|  | Outer end portion |  | Not communicating with the shallow groove | Not communicating with the shallow groove | Not communicating with the shallow groove |
|  | Variation in groove depth |  | Yes | Yes | Yes |
|  | Angle at bent portion | ° | 120 | 120 | 120 |
| Mud Performance |  | Index value | 104 | 105 | 103 |
| Damage Resistance |  | Index value | 104 | 103 | 105 |

TABLE 2-2

|  |  |  | Example 7 | Example 8 | Example 9 |
|---|---|---|---|---|---|
| Angle θa of first wall |  | ° | 15 | 15 | 15 |
| Angle θb of second wall |  | ° | 5 | 5 | 5 |
| Average angle | First region | ° | 90 | 90 | 90 |
|  | Second region | ° | 130 | 130 | 130 |
|  | Third region | ° | 70 | 70 | 70 |
| Sipe 1 | Presence of bent portion |  | Yes | Yes | Yes |
|  | Inner end portion |  | Communicating with the inclined groove | Communicating with the inclined groove | Communicating with the inclined groove |
|  | Outer end portion |  | Not communicating with the notch | Not communicating with the notch | Not communicating with the notch |
|  | Variation in groove depth |  | Yes | Yes | Yes |
|  | Angle at bent portion | ° | 120 | 120 | 120 |
| Sipe 2 | Presence of bent portion |  | Yes | Yes | Yes |
|  | Inner end portion |  | Communicating with the notch | Not communicating with the notch | Not communicating with the notch |
|  | Outer end portion |  | Communicating with the groove | Not communicating with the groove | Communicating with the groove |
|  | Variation in groove depth |  | Yes | Yes | Yes |
|  | Angle at bent portion | ° | 120 | 120 | 120 |
| Sipe 3 | Presence of bent portion |  | Yes | Yes | Yes |
|  | Inner end portion |  | Communicating with the groove | Communicating with the groove | Not communicating with the groove |
|  | Outer end portion |  | Not communicating with the shallow groove | Not communicating with the shallow groove | Not communicating with the shallow groove |
|  | Variation in groove depth |  | Yes | Yes | Yes |
|  | Angle at bent portion | ° | 120 | 120 | 120 |
| Mud Performance |  | Index value | 105 | 103 | 103 |
| Damage Resistance |  | Index value | 103 | 105 | 105 |

TABLE 2-3

|  |  |  | Example 10 | Example 11 | Example 12 |
|---|---|---|---|---|---|
| Angle θa of first wall |  | ° | 15 | 15 | 15 |
| Angle θb of second wall |  | ° | 5 | 5 | 5 |
| Average angle | First region | ° | 90 | 90 | 90 |
|  | Second region | ° | 130 | 130 | 130 |
|  | Third region | ° | 70 | 70 | 70 |
| Sipe 1 | Presence of bent portion |  | Yes | Yes | Yes |
|  | Inner end portion |  | Communicating with the inclined groove | Communicating with the inclined groove | Communicating with the inclined groove |
|  | Outer end portion |  | Not communicating with the notch | Not communicating with the notch | Not communicating with the notch |
|  | Variation in groove depth |  | Yes | No | Yes |
|  | Angle at bent portion | ° | 120 | 120 | 85 |
| Sipe 2 | Presence of bent portion |  | Yes | Yes | Yes |
|  | Inner end portion |  | Not communicating with the notch | Not communicating with the notch | Not communicating with the notch |
|  | Outer end portion |  | Communicating with the groove | Communicating with the groove | Communicating with the groove |
|  | Variation in groove depth |  | Yes | No | Yes |
|  | Angle at bent portion | ° | 120 | 120 | 85 |
| Sipe 3 | Presence of bent portion |  | Yes | Yes | Yes |
|  | Inner end portion |  | Communicating with the groove | Communicating with the groove | Communicating with the groove |
|  | Outer end portion |  | Communicating with the shallow groove | Not communicating with the shallow groove | Not communicating with the shallow groove |
|  | Variation in groove depth |  | Yes | No | Yes |
|  | Angle at bent portion | ° | 120 | 120 | 85 |
| Mud Performance |  | Index value | 105 | 104 | 103 |
| Damage Resistance |  | Index value | 103 | 104 | 103 |

As is clear from Table 1, compared to Comparative Example 1, Examples 1 to 12 provide improved mud performance and damage resistance and achieve both mud performance and damage resistance in a well-balanced, compatible manner to a high degree. Note that only the mud performance on muddy road surfaces was evaluated but that, even in a case where the vehicle travels on other unpaved roads (snowy roads, sandy ground, rocky areas, or the like), the tire according to the embodiment of the present technology provides functions for sand, stone, rock, or the like on road surfaces, the functions being similar to the functions for mud on muddy road surfaces, favorably exhibiting superior driving performance on unpaved roads and high damage resistance.

On the other hand, in Comparative Examples 2 and 3, the first wall or the second wall has an excessively large angle (θa or θb) and thus fails to obtain a sufficient effect of improving mud performance. In Comparative Examples 4 and 5, the average angle of the sipes in each region is outside the range of the present technology, preventing both mud performance and damage resistance from being provided in a compatible manner. In Comparative Example 6, each sipe does not include a bent portion, and thus preventing both mud performance and damage resistance from being provided in a compatible manner.

The invention claimed is:

1. A pneumatic tire comprising a tread portion extending in a tire circumferential direction to form an annular shape, a pair of sidewall portions disposed on both sides of the tread portion, and a pair of bead portions disposed inward of the sidewall portions in a tire radial direction, wherein
a plurality of center blocks are provided in a center region of the tread portion, and a plurality of shoulder blocks are provided in a shoulder region of the tread portion, the center blocks are arranged in pairs across inclined grooves extending at an incline with respect to the tire circumferential direction, the center block on one side of each of the pairs of center blocks extends from one side to an other side of a tire equator across the tire equator, the center block on the other side extends from the other side to the one side of the tire equator across the tire equator, each center block includes a notch defined by two wall surfaces connected in a V-shape in a tread contact surface, the two wall surfaces include a first wall extending at an angle of within ±20° with respect to the tire circumferential direction in the tread contact surface and a second wall extending at an angle of within ±10° with respect to a tire lateral direction, a sipe is formed in each of the center blocks and the shoulder blocks, a first region is defined as a range from 0% to 12.5% of a distance W from the tire equator to an end portion of the tread contact surface with reference to the tire equator, a second region is defined as a range from 12.5% to 75% of the distance W, a third region is defined as a range from 75% to 100% of the distance W, an average angle of the sipes in the first region is within a range of 90°±10° with respect to the tire equator, an average angle of the sipes in the second region is within a range of 130°±10° with respect to the tire equator, an average angle of the sipes in the third region is within a range of 70°±10° with respect to the tire equator, and each of the sipes includes at least one bent portion;

wherein the sipe formed in each of the center blocks comprises a pair of sipes extending across the notch, the pair of sipes being formed on both sides of the two wall surfaces of the notch of the center blocks.

2. The pneumatic tire according to claim 1, wherein the pair of sipes formed in the center block includes a sipe including a first end communicating with the inclined groove and a second end terminating in the center block without communicating with the notch.

3. The pneumatic tire according to claim 2, wherein
the pair of sipes formed in the center block includes a sipe including a first end communicating with a groove formed between the center block and the shoulder block and a second end terminating in the center block without communicating with the notch.

4. The pneumatic tire according to claim 3, wherein
the sipe formed in the shoulder block at a first end communicates with a groove formed between the center block and the shoulder block and at a second end terminates within the shoulder block.

5. The pneumatic tire according to claim 4, wherein
the shoulder block is provided with a shoulder groove extending from a road contact surface of the shoulder block to an outer side surface of the shoulder block in the tire lateral direction, and the second end of the sipe formed in the shoulder block, the second end terminating within the shoulder block, terminates without communicating with the shoulder groove.

6. The pneumatic tire according to claim 5, wherein
each of the sipes includes a portion with a large sipe depth and a portion with a small sipe depth, and has a small sipe depth at least at both end portions of the sipe.

7. The pneumatic tire according to claim 6, wherein
an angle formed between linearly extending portions on both sides of the bent portion at the bent portion of each of the sipes is greater than 90°.

8. The pneumatic tire according to claim 1, wherein
the pair of sipes formed in the center block includes a sipe including a first end communicating with a groove formed between the center block and the shoulder block and a second end terminating in the center block without communicating with the notch.

9. The pneumatic tire according to claim 1, wherein
the sipe formed in the shoulder block at a first end communicates with a groove formed between the center block and the shoulder block and at a second end terminates within the shoulder block.

10. The pneumatic tire according to claim 9, wherein
the shoulder block is provided with a shoulder groove extending from a road contact surface of the shoulder block to an outer side surface of the shoulder block in the tire lateral direction, and the second end of the sipe formed in the shoulder block, the second end terminating within the shoulder block, terminates without communicating with the shoulder groove.

11. The pneumatic tire according to claim 1, wherein
each of the sipes includes a portion with a large sipe depth and a portion with a small sipe depth, and has a small sipe depth at least at both end portions of the sipe.

12. The pneumatic tire according to claim 1, wherein
an angle formed between linearly extending portions on both sides of the bent portion at the bent portion of each of the sipes is greater than 90°.

* * * * *